(12) United States Patent
Andelfinger

(10) Patent No.: US 7,928,698 B2
(45) Date of Patent: Apr. 19, 2011

(54) BATTERY CHARGING APPARATUS AND METHOD

(75) Inventor: Richard L. Andelfinger, Chandler, AZ (US)

(73) Assignee: SPX Corporation, Charlotte, NC (US)

( * ) Notice: Subject to any disclaimer, the term of this patent is extended or adjusted under 35 U.S.C. 154(b) by 553 days.

(21) Appl. No.: 12/054,516

(22) Filed: Mar. 25, 2008

(65) Prior Publication Data

US 2009/0243547 A1 Oct. 1, 2009

(51) Int. Cl.
*H01M 10/44* (2006.01)
*H01M 10/46* (2006.01)

(52) U.S. Cl. ...................................... 320/138

(58) Field of Classification Search ............... 320/103, 320/107, 112, 114, 128, 138, 166, 167; 307/18, 307/19, 21
See application file for complete search history.

(56) References Cited

U.S. PATENT DOCUMENTS

| | | | |
|---|---|---|---|
| 6,037,778 A | 3/2000 | Makhija | |
| 6,384,608 B1 | 5/2002 | Namaky | |
| 6,388,448 B1 | 5/2002 | Cervas | |
| 6,459,968 B1 | 10/2002 | Kochie | |
| 6,667,624 B1 | 12/2003 | Raichle et al. | |
| 6,784,637 B2 | 8/2004 | Raichle et al. | |
| 6,838,856 B2 | 1/2005 | Raichle | |
| 6,911,825 B2 | 6/2005 | Namaky | |
| 6,988,053 B2 | 1/2006 | Namaky | |
| 7,076,375 B2 | 7/2006 | Raichle et al. | |
| 7,078,879 B2 | 7/2006 | Makhija | |
| 7,148,657 B2 | 12/2006 | Raichle et al. | |
| 7,750,505 B2 * | 7/2010 | Ichikawa | 320/128 |
| 2003/0085713 A1 | 5/2003 | Krampitz | |
| 2004/0066174 A1 * | 4/2004 | Choi | 320/149 |
| 2006/0145701 A1 | 7/2006 | Koran | |
| 2006/0208696 A1 | 9/2006 | Makhija | |
| 2007/0114968 A1 * | 5/2007 | Krah et al. | 320/103 |
| 2007/0194755 A1 | 8/2007 | Makhija et al. | |
| 2007/0210800 A1 | 9/2007 | Krampitz et al. | |
| 2007/0210801 A1 | 9/2007 | Krampitz et al. | |
| 2007/0278990 A1 | 12/2007 | Raichle et al. | |

* cited by examiner

*Primary Examiner* — Edward Tso
(74) *Attorney, Agent, or Firm* — Baker & Hostetler LLP

(57) ABSTRACT

A battery charger that includes a primary switching-mode power supply, a secondary switching-mode power supply and a capacitor that is electrically connected to these two power supplies. In operation, this battery charger may be used to reverse the sulfation process in a battery. Also, a battery charging method that may be used to reverse the sulfation process in a battery.

20 Claims, 1 Drawing Sheet

BATTERY CHARGING APPARATUS AND METHOD

FIELD OF THE INVENTION

The present invention relates generally to battery chargers and methods for the operation thereof. More particularly, the present invention relates to battery chargers and battery charging methods for vehicular and larger batteries.

BACKGROUND OF THE INVENTION

Lead-acid batteries, which are frequently found in cars, trucks, boats and other vehicles, typically include a set of plate electrodes that themselves include lead and lead oxide. These electrodes are usually encased in a battery housing and immersed in a sulfuric acid-based electrolyte.

While in operation, the above-mentioned chemical components of lead-acid batteries react with each other to form an amorphous lead sulfate. Then, when such batteries are being recharged, much of the amorphous lead sulfate is converted back into a combination of lead, lead oxide and sulfuric acid. However, over time, a more stable crystalline lead sulfate also forms within a battery. Because this crystalline lead sulfate is not a strong conductor of electricity, when too much crystalline lead sulfate has formed, the battery becomes non-functional. This degradation process is referred to as "sulfation" and accelerates in batteries that are operated at higher temperatures.

In many instances, rather than replacing a heavily sulfated battery, it is more desirable to recover at least some of the functionality of the battery by removing some of the crystalline lead sulfate that has formed therein. In order to accomplish this removal of crystalline lead sulfate, battery chargers capable of providing sufficient voltages and currents to at least partially reverse the sulfation process are used. However, the battery chargers currently available to reverse the sulfation process make use of transformers that are heavy (i.e., that often weigh 100 pounds or more) and that generate a large amount of heat.

In addition to being heavy and generating a large amount of heat, the above-discussed transformers also do not have power factors of between 0.95 and 1.0. Hence, battery chargers including such transformers do not meet European standards and therefore cannot obtain Conformité Européene (CE) markings. Further, because the above-mentioned transformers are effectively hard-wired to operate at a particular voltage, currently available battery chargers capable of at least partially reversing the sulfation process cannot be operated both at locations solely providing voltage levels of 120V and at locations solely providing voltage levels of 220V. Rather, two different battery chargers would have to be purchased.

SUMMARY OF THE INVENTION

At least in view of the above, it would be desirable to provide relatively lightweight battery chargers that operate at relatively low temperatures but that nonetheless are capable of reversing the sulfation process in a battery. It would also be desirable to provide sulfation-process-reversing battery chargers that have power factors of at least 0.95 and that are capable of operating at different voltage levels. In addition, it would also be desirable to provide battery charging methods utilizing such battery chargers.

The foregoing needs are met, to a great extent, by certain embodiments of the present invention. For example, according to one embodiment of the present invention, a battery charger is provided that includes a primary switching-mode power supply. The battery charger also includes a secondary switching-mode power supply electrically connected to the primary switching-mode power supply. The batter charger further includes a capacitor electrically connected to the secondary switching-mode power supply. In addition, the battery charger also includes a lead electrically connected to the capacitor and configured to be connected to a battery.

In accordance with another embodiment of the present invention, a method of charging a battery is provided. The method includes partially charging a capacitor using a primary switching-mode power supply electrically connected to the capacitor. The method also includes supplementally charging the capacitor using a secondary switching-mode power supply electrically connected to the capacitor. In addition, the method also includes discharging charge from the capacitor into a battery electrically connected to the capacitor once the charge in the capacitor reaches a specified level.

In accordance with yet another embodiment of the present invention, another battery charger is provided. The battery charger includes primary charging means for partially charging a capacitor, wherein the primary charging means is electrically connected to the capacitor. The battery charger also includes supplemental charging means for supplementally charging the capacitor, wherein the supplemental charging means is electrically connected to the capacitor. In addition, the battery charger further includes discharging means for discharging charge from the capacitor into a battery electrically connected to the capacitor once the charge in the capacitor reaches a specified level.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
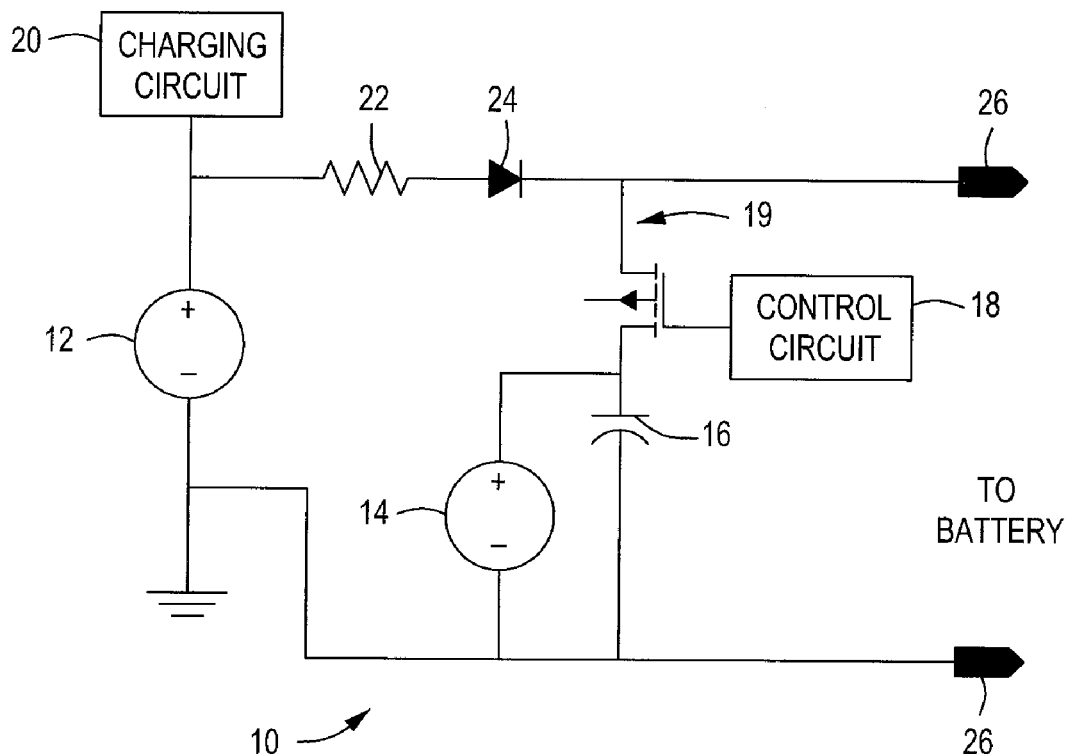
FIG. 1 is a circuit diagram of a battery charger according to an embodiment of the present invention.

The invention will now be described with reference to the drawing figures, in which like reference numerals refer to like parts throughout. FIG. 1 illustrates a circuit diagram 10 of a battery charger according to an embodiment of the present invention. The circuit diagram 10 includes a primary switching-mode power supply 12, a secondary switching-mode power supply 14, a capacitor 16, a control circuit 18, a switch 19, a charging circuit 20, a shunt resistor 22, a diode 24 and a pair of battery leads 26 that are all, either directly or indirectly, electrically connected to each other.

The switching-mode power supplies 12, 14 are electronic power supply units that each include a switching regulator therein. More specifically, each of the switching-mode power supplies 12, 14 actively switches a transistor included therein between full saturation (i.e., an "on" position) and full cutoff (i.e., an "off" position) at a high rate. This turns alternating current (AC) input into each of the switching-mode power supplies 12, 14 into rectangular waveforms that are then passed through low-pass filters also included within each of the switching-mode power supplies 12, 14. As a result, each of the switching-mode power supplies 12, 14 outputs a substantially constant output voltage of a specified level.

Because they do not include or rely upon the use of transformers, the switching-mode power supplies 12, 14 generate relatively little heat. In addition, relative to devices that include transformers, the switching-mode power supplies 12, 14 are also relatively very lightweight. In fact, some switching-mode power supplies according to embodiments of the present invention weigh less than 15 pounds.

When a battery charger that includes the circuit 10 is in use, the leads 26 are typically electrically connected to a lead-acid battery (not illustrated). However, other types of batteries are also within the scope of the present invention.

According to certain embodiments of the present invention, when the circuit 10 is in use, the primary switching-mode power supply 12 is configured to operate at a voltage level that is only slightly higher than a voltage level at which the battery connected to the leads 26 typically operates. Also, according to some of these embodiments, the primary switching-mode power supply 12 operates at a lower voltage level but at a higher current level than the secondary switching-mode power supply 14. In addition, according to some of these embodiments, the secondary switching-mode power supply 14 is configured to operate at a voltage level that is substantially higher than the voltage level at which the battery typically operates.

The rationale for operating the power supplies 12, 14 at such levels will become more apparent during the discussion of battery charging processes according to certain embodiments of the present invention. However, it should be noted at this point that the moderate level of voltage and high level of current available from the primary switching-mode power supply 12 may be combined in the capacitor 16 with the high level of voltage and low level of current available from the secondary switching-mode power supply 14. Together, these combined energies can periodically provide a battery with a pulse of charge that substantially equals the levels of current and voltage provided by a transformer.

An advantage of using switching-mode power supplies 12, 14 is that such power supplies, according to certain embodiments of the present invention, may be designed or selected to be capable of automatically adjusting to operate at a variety of voltage levels. For example, the primary switching-mode power supply 12 may be designed such that it can operate when the battery charger is plugged into either a 120V outlet or a 220V outlet without any modification from the operator of the battery charger. In other words, the power supplies 12, 14 are capable of automatically adjusting to operate at whatever operating voltage level is being provided to them.

The capacitor 16 illustrated in FIG. 1, according to certain embodiments of the present invention, is a high-energy-density capacitor. For example, the capacitor 16 may be a double-layer capacitor (e.g., a commercially available MAXCAP capacitor) and may have a capacitance up to or above approximately 50,000 µF and a working voltage of up to or above approximately 35 VDC. According to certain embodiments of the present invention, the capacitor 16 is chosen such that the capacitor 16 is capable of providing a sufficient amount of current at a sufficiently high voltage to reverse sulfation in the battery when electrically connected thereto.

The control circuit 18 illustrated in FIG. 1 controls and may be designed to include the switch 19 also illustrated in FIG. 1. When the capacitor 16 has been charged to a specified level by the power supplies 10, 12, the control circuit 18 closes the switch 19 and effectively electrically connects the capacitor 16 to a battery that is electrically connected to the leads 26. Before the capacitor 16 has been charged to the specified level, the control circuit 18 maintains the switch 19 in an open position and allows the power supplies 12, 14 to continue charging the capacitor 16. According to certain embodiments of the present invention, the switch 19 is a solid state switch such as, for example, a MOSFET.

The charging circuit 20 illustrated in FIG. 1 is configured to monitor the amount of current traveling to a battery that is connected to the leads 26. The charging circuit 20 is also configured to detect the charging level of the battery when the battery is electrically connected to the leads 26. As the charging level of the battery approaches a saturation level, the charging circuit 20 gradually reduces the amount of current that reaches the battery. This may be accomplished, for example, via direct control of the primary power supply 12 through an external programming voltage input (not illustrated).

The shunt resistor 22 illustrated in FIG. 1 is electrically connected to the primary switching-mode power supply 12. In essence, by allowing a system operator to measure the voltage drop thereacross, the shunt resistor 22 allows for monitoring of the current between the primary switching-mode power supply 12 and the capacitor 16. According to certain embodiments of the present invention, other current monitors may be included at other locations within the circuit 10.

The diode 24 illustrated in FIG. 1 is electrically connected between the primary switching-mode power supply 12 and one of the leads 26. While the battery charger that includes the circuit 10 is in operation, the diode 24 prevents voltage/energy pulses from traveling between the capacitor 16 and the primary switching-mode power supply 12. Rather, when the switch 19 is in the "closed" position, these pulses are forced to travel from the capacitor 16 to a battery attached to the leads 26.

Methods of charging a battery and/or to reverse sulfation therein are also provided according to certain embodiments of the present invention. Some of these methods make use of battery chargers that include the circuit 10 illustrated in FIG. 1 and discussed above. However, alternate battery chargers are also within the scope of the present invention.

According to certain embodiments of the present invention, when charging a battery and/or reversing sulfation therein, a capacitor (e.g., capacitor 16) is partially charged using, for example, a primary switching-mode power supply (e.g., power supply 12) that is electrically connected to the capacitor. Also, the capacitor is supplementally charged using a secondary switching-mode power supply (e.g., power supply 14) that is also electrically connected to the capacitor. It should be noted that both of these charging steps may take place simultaneously or may have some period of overlap.

The partially charging step typically includes charging the capacitor at a voltage level that is only slightly higher (and even sometimes slightly lower) than a voltage level at which a battery that is connected to the battery charger typically operates. For example, when charging a 14-volt battery, the primary switching-mode power supply may charge the capacitor using a voltage level between 13.8V and 15V. However, the current level used to charge the capacitor is typically approximately equal to the current level at which the battery normally operates (e.g., 100 amps).

The supplementally charging step is generally performed at a lower current level but higher voltage level than the partially charging step. For example, the supplementally charging step may be performed at a voltage level of 24V and a current level of 10 amps. Typically, the supplementally charging step includes charging the capacitor at a voltage level that is sufficient to reverse sulfation in the battery. However, the current level during the supplementally charging step is substantially lower than the current level typically used to reverse sulfation using transformer-based battery chargers.

The above-discussed partially charging and supplementally charging of the capacitor 16 continues to be performed until the capacitor has reached a specified level of the charge. Then, charge from the capacitor is discharged into a battery that is electrically connected to the capacitor. Generally, the specified level of charge is discharged at a voltage and current level that is sufficient to reverse the sulfation process in a battery for at least a short increment of time (e.g., 8 to 10 milliseconds). Hence, each time that the discharging step is carried out on a battery, a small portion of crystalline lead sulfate in the battery is converted out of the crystalline phase and into a more conductive state.

Figure 2:
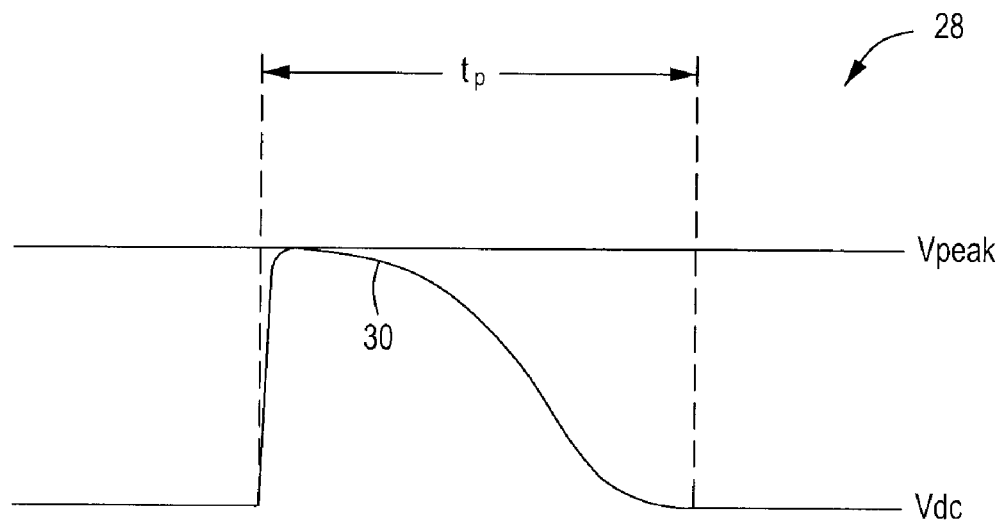
FIG. 2 is a graph of a voltage pulse that is used to charge and desulfate a battery according to an embodiment of the present invention.

FIG. 2 is a graph 28 of a voltage pulse 30 that is used to charge and desulfate a battery according to an embodiment of the present invention. The pulse extends over a pulse time period ($t_p$) and fluctuates between a baseline voltage ($V_{DC}$) and a peak voltage ($V_{PEAK}$). Typically, the baseline voltage is approximately equal to the operating voltage of the primary switching-mode power supply (e.g., between 13.8V and 14.4V) and the peak voltage is substantially equal to the operating voltage of the secondary switching-mode power supply (e.g., between 18V and 25V).

Because the pulse 30, according to certain embodiments of the present invention, lasts only a few milliseconds, each pulse 30 only desulfates a relatively small region of a battery. As such, in order to convert relatively large amounts of crystalline lead sulfate in a battery back to an amorphous form, the partially charging, supplementally charging and discharging steps are repeated periodically over a specified time period, often lasting over several hours.

According to certain embodiments of the present invention, the above-discussed method includes automatically adjusting at least one of the primary switching-mode power supply and the secondary switching-mode power supply to operate at an operating voltage level being provided thereto. As mentioned above, such automatic adjustment is sometimes a design characteristic of switching-mode power supplies. Hence, implementing this step sometimes includes selecting appropriate switching-mode power supplies.

Appropriate selection of switching-mode power supplies also, according to certain embodiments of the present invention, involves choosing power supplies that have power factors above approximately 0.95. When such power supplies are selected, battery chargers according to the present invention are generally eligible for CE markings and therefore eligible for sale in European countries.

The above-discussed method for may also include the step of monitoring current traveling to a battery that is electrically connected to the battery charger. This monitoring step may be implemented, for example, using the shunt resistor 22 illustrated in FIG. 1 and monitoring the voltage drop across the resistor 22.

In addition, the above-discussed method may also include detecting the charge level of the battery connected to the battery charger. One method of implementing this detecting step includes using the charging circuit 20 discussed above. Also, methods according to certain embodiments of the present invention include gradually decreasing the amount of current that flows to the battery as the charging level in the battery approaches an operating capacity threshold. This step may be implement, for example, using the control circuit 18 and switch 19 illustrated in FIG. 1.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A battery charger, comprising:
   a primary switching-mode power supply;
   a secondary switching-mode power supply electrically connected to the primary switching-mode power supply;
   a capacitor electrically connected to the secondary switching-mode power supply; and
   a lead electrically connected to the capacitor and configured to be connected to a battery.

2. The battery charger of claim 1, further comprising:
   a control circuit electrically connected to the capacitor, wherein the control circuit connects the capacitor to the battery when both the battery is electrically connected to the lead and the capacitor has been charged to a specified level.

3. The battery charger of claim 2, wherein the control circuit comprises a solid state switch.

4. The battery charger of claim 1, further comprising:
   a charging circuit electrically connected to the lead and configured to monitor current travelling to the battery and to detect a charging level in the battery when the battery is electrically connected to the lead.

5. The battery charger of claim 1, further comprising:
   a shunt resistor electrically connected to the primary switching-mode power supply.

6. The battery charger of claim 1, further comprising:
   a diode electrically connected between the primary switching-mode power supply and the lead.

7. The battery charger of claim 1, wherein the primary switching-mode power supply operates at a lower voltage level and higher current level than the secondary switching-mode power supply.

8. The battery charger of claim 1, wherein the primary switching-mode power supply is configured to operate at a voltage level only slightly higher than a voltage level at which the battery typically operates.

9. The battery charger of claim 1, wherein the secondary switching-mode power supply is configured to operate at a voltage level substantially higher than a voltage level at which the battery typically operates.

10. The battery charger of claim 1, wherein the capacitor comprises a high energy density capacitor.

11. The battery charger of claim 1, wherein at least one of the primary switching-mode power supply and the secondary switching-mode power supply is configured to automatically adjust to operate at an operating voltage level being provided thereto.

12. A method of charging a battery, the method comprising:
partially charging a capacitor using a primary switching-mode power supply electrically connected to the capacitor;
supplementally charging the capacitor using a secondary switching-mode power supply electrically connected to the capacitor; and
discharging a charge from the capacitor into a battery electrically connected to the capacitor once the charge in the capacitor reaches a specified level.

13. The method of claim 12, wherein the supplementally charging step is performed at a lower current level and higher voltage level than the partially charging step.

14. The method of claim 12, further comprising:
periodically repeating the partially charging, supplementally charging and discharging steps over a specified time period.

15. The method of claim 12, wherein the partially charging step comprises charging the capacitor at a voltage level only slightly higher than a voltage level at which the battery typically operates.

16. The method of claim 12, wherein the supplementally charging step comprises charging the capacitor at a voltage level sufficient to reverse sulfation in the battery.

17. The method of claim 12, further comprising:
monitoring a current traveling to the battery;
detecting a charging level in the battery; and
gradually decreasing the current as the charging level in the battery approaches an operating capacity threshold.

18. The method of claim 12, wherein the partially charging and supplementally charging steps comprise choosing the primary switching-mode power supply and the secondary switching-mode power supply to each have power factors above approximately 0.95.

19. The method of claim 12, further comprising:
automatically adjusting at least one of the primary switching-mode power supply and the secondary switching-mode power supply to operate at an operating voltage level being provided thereto.

20. A battery charger, comprising:
primary charging means for partially charging a capacitor, wherein the primary charging means is electrically connected to the capacitor;
supplemental charging means for supplementally charging the capacitor, wherein the supplemental charging means is electrically connected to the capacitor; and
discharging means for discharging a charge from the capacitor into a battery electrically connected to the capacitor once the charge in the capacitor reaches a specified level.

* * * * *